United States Patent Office 2,797,211
Patented June 25, 1957

2,797,211

FREE-FLOWING ROSIN MATERIALS

Richard D. Morin, Columbus, and Robert E. Sharpe, Worthington, Ohio, assignors, by mesne assignments, to G & A Laboratories, Inc., Savannah, Ga., a corporation of Georgia No Drawing. Application April 22, 1955,
Serial No. 503,331

8 Claims. (Cl. 260—97)

This invention relates to free-flowing rosin compositions. More particularly, this invention relates to rosin particles which are maintained in a free-flowing condition even under conditions of storage.

Rosin materials, such as gum rosin, wood rosin, tall oil (or sulfate) rosin, and modified rosins, when in the particleized state have the characteristic of fusing or coalescing during storage or shipment. Although the elevated temperatures to which the rosin materials may be subjected during storage or shipment are normally below the softening or flow point of the rosins, agglomeration of the rosin particles occurs. Some rosins and modified rosins disadvantageously will agglomerate or coalesce at room temperatures, even though the softening point of such rosins may be well above ordinary room temperature. For example, a modified rosin, such as is produced by iodine disproportion of wood rosin having a softening point of about 146° F. to 152° F. will coalesce to a solidified mass upon storage at room temperatures. The rate of agglomeration, of course, is greatly accelerated when the modified rosin is exposed to temperatures as high as 130° F., such as is often encountered in shipment. This presents serious handling and processing difficulties. The agglomerated rosin must be either melted or physically reduced in size in order to obtain the rosin in a useable and easily processable form. In many instances the container in which the rosin is packaged is cut or stripped away from the rosin. The attendant economical disadvantages in the processing of the rosin materials into useable and easily handled form are obvious.

The present invention primarily concerns particleized rosin materials which are maintained in a free-flowing condition, even after storage, at elevated temperatures below the softening point of the rosin. In accordance with this invention, the rosin particles are thoroughly mixed with a finely divided clay. In general, finely divided clay will maintain particleized rosin materials in a free-flowing condition at room temperature (about 75° F.). However, not all clays successfully maintain particleized rosin materials in a free-flowing condition at elevated temperatures normally encountered in storage or shipment. It has been found that a clay of definite mineralogical classification, specifically attapulgite clay, is capable of maintaining the particleized rosin materials in a free-flowing condition, even at temperatures above room temperature normally encountered in storage and shipment. Attapulgite clay, sometimes referred to as attapulgite fuller's earth, is so named because of the dominant presence of the clay mineral attapulgite which is unique among the clay minerals, in that its structure is chainlike, similar to the amphibole (hornblende) structure, and dissimilar to the micalike sheets of other clay mineral groups. Described chemically, attapulgite clay is a high-magnesium content hydrated aluminum magnesium silicate. Although chemical analysis is of little value in determining the properties or usefulness of clays, the approximate chemical analysis of attapulgite clay is given for the purpose of a full disclosure. The analysis is representative of the clay after the raw clay has been ground and dried. The analysis on a volatile-free basis is expressed in terms of the oxides present:

| | Percent |
|---|---|
| $SiO_2$ | 67.0 |
| $Al_2O_3$ | 12.5 |
| $MgO$ | 11.0 |
| $Fe_2O_3$ | 4.0 |
| $CaO$ | 2.5 |
| Other | 3.0 |
| | 100.0 |

Attapulgite clay exhibits exceptional sorptive capacity and it is probably for this reason that the clay is sometimes referred to as attapulgite fuller's earth.

The following examples, the results of which are tabulated in Table I, are illustrative of the invention. In each example, the clay used was at least 90 to 95% finer than 200 mesh. To especially illustrate the invention, the examples given are with modified rosins which have been produced by iodine disproportionation. These modified rosins have softening points lower than the softening points of the original unmodified rosins and therefore serve to effectively illustrate the invention. The iodine disproportionation reaction is a well-known method of stabilizing rosin toward oxidation and is described in U. S. Patent 2,299,577.

Example 1

A mixture of attapulgite clay and modified gum rosin which had been disproportionated by iodine, combined in the proportion of one part clay to nine parts —40 mesh rosin, was free-flowing at room temperatures, and remained a free-flowing powder after storage for one week at a temperature of 130° F. Other mixtures of the attapulgite clay and —40 mesh modified wood rosin, which had been disproportionated by iodine, combined in the proportion of 15 and 20 parts of the clay to 85 and 80 parts, respectively, of the rosin also remained free-flowing powders at room temperature, and after storage for one week at a temperature of 130° F. The attapulgite clay prevented the rosin from fusing or agglomerating when subjected to the elevated temperatures over an extended period of time.

Example 2

One part of southern bentonite and one part of western bentonite, respectively, were each blended with nine parts of iodine disproportionated gum rosin which had been ground to about —40 mesh. When stored at room temperature these mixtures of rosin and bentonite remained as a free-flowing powder and did not fuse or agglomerate after storage in excess of seven days. When subjected to storage at a temperature of 130° F., the rosin and bentonite mixtures fused within 24 hours to a hard cakelike mass.

Example 3

A series of kaolin clays were blended with rosins and tested for storageability at room temperature and at elevated temperatures. One part of each china clay, white clay, coating clay, and Barnett clay (a clay having a typical analysis of a kaolin clay mined in the area of North Aiken, S. C.) were each blended with nine parts of iodine disproportionated gum rosin which had been ground to about —40 mesh. When stored at room temperature, these rosin-kaolin clay mixtures remained as a free-flowing powder and did not fuse or agglomerate after storage in excess of seven days. When subjected to storage at 130° F., the modified rosin-kaolin clay mixtures fused within 24 hours to a hard cakelike mass.

Example 4

One part of a sedimentary or secondary kaolin of the type found in the region of Bath, S. C., was blended with nine parts of iodine disproportionated gum rosin which had been ground to about −40 mesh. The mixture of the rosin and the secondary kaolin remained free-flowing and did not fuse or agglomerate after storage in excess of seven days at room temperature. However, when subjected to storage at 130° F., local areas fused solidly or the entire mass fused loosely within 24 hours at this temperature.

Example 5

Nine parts of iodine disproportionated gum rosin ground to −40 mesh was blended with one part of a fuller's earth of unknown origin. The mixture was a free-flowing powder after storage at room temperature for several days. However, when subjected to storage at 130° F., the mixture fused within 24 hours to a hard, cakelike mass.

Example 6

A series of mixtures of diatomaceous earths and modified rosin (disproportionated by iodine) were blended in the proportion of one part diatomaceous earth to nine parts of the modified gum rosin which had been ground to about −40 mesh. In each case, the mixture was a free-flowing powder after storage at room temperature for several days. Upon storage at 130° F. for one week, the mixtures varied from complete fusion within 24 hours to local solid fusion to the entire mass being fused loosely.

Example 7

One part of talc was blended with nine parts of an iodine disproportionated gum rosin which had been ground to about −40 mesh. This mixture remained as a free-flowing powder at room temperature. When subjected to storage at 130° F., the rosin-talc mixture fused within 24 hours to a hard, cakelike mass.

TABLE I

| Example No. | Additive | Storage Temperature | |
|---|---|---|---|
| | | Room Temperature | 130° F. |
| 1 | Attapulgite Clay | +++ | +++ |
| 2 | Southern Bentonite | +++ | − |
| 2 | Western Bentonite | +++ | − |
| 3 | China Clay | +++ | − |
| 3 | White Clay | +++ | − |
| 3 | Coating Clay | +++ | − |
| 3 | Barnett Clay | +++ | − |
| 4 | Sedimentary Kaolin | +++ | + |
| 5 | Fuller's Earth | +++ | − |
| 6 | Diatomaceous Earth | +++ | − to + |
| 7 | Talc | +++ | − |

Note:
− denotes fused within 24 hours.
+ denotes some areas fused solidly or entire mass fused loosely.
+++ denotes free-flowing.

As illustrated in the examples, the mixtures of the rosin materials containing the attapulgite clay advantageously remain as a free-flowing powder even after storage at elevated temperatures. The rosin-attapulgite clay mixtures continued to be free-flowing after the exposure to high temperatures without evidence of any tendency to coalesce or agglomerate.

To determine the effect of size of the rosin particles, samples of rosin particles of various size ranges were prepared. Modified wood rosin (disproportionated by iodine) was ground and screened into narrow particle size ranges. These samples were mixed with about 15 percent by weight of the attapulgite clay and checked for storage properties. The storage properties of the samples are tabulated in Table II. In general, with the same amount of attapulgite clay, the samples of the rosin of larger particle size, as shown in Table II, remain free-flowing, while the samples of smaller particle size fuse or cake. The particle size at which the particles began to fuse or agglomerate was determined at about −100 to +140 mesh. The effect of larger size rosin particles was determined in a somewhat different manner. The modified wood rosin was lightly ground and screened several times to eliminate an undue amount of fine particles. Everything that passed through the stated screen in Table III was taken and mixed with about 15 percent by weight of the attapulgite clay. The results of these tests, using screens up to 8 mesh, are shown in Table III.

TABLE II

| Particle Size | Storage Properties at 130° F. |
|---|---|
| −20 +30 mesh | Free-flowing. |
| −30 +40 mesh | Do. |
| −40 +70 mesh | Do. |
| −70 +100 mesh | Do. |
| −100 +140 mesh | Loosely caked. |
| −140 +200 mesh | Firmly caked and fused. |
| −200 +325 mesh | Loosely caked. |
| −325 mesh | Firmly caked and fused. |

TABLE III

| Screen Size | Storage Properties |
|---|---|
| 20 mesh | Free-flowing. |
| 12 mesh | Do. |
| 8 mesh | Do. |

Still larger size rosin particles, in the form of pellets ranging in size from about 3 to 8 mesh, were intimately mixed with approximately 1 percent attapulgite clay. These mixtures of the attapulgite clay and these rosin pellets similarly remain free-flowing under the storage conditions at 130° F.

The proportions of the rosin to clay may be varied widely but in all instances must be at least that amount sufficient to form a dustlike coating on the surface of the rosin particles. In order to maintain the desired free-flowing properties, the clay must be present in an amount of at least about 1 percent by weight of the mixture of the particleized rosin and the attapulgite clay. A clay content of about 5 to about 25 percent is usually sufficient for maintaining the flowability of the particleized rosin, while a clay content of about 10 to about 20 percent is preferred. It is, of course, desirable to keep the clay content as low as possible. Clay present in amounts in excess of 50 percent does not materially aid the free-flowing properties of the particelized rosins but rather acts merely as an unnecessary diluent of the rosin product.

Although the examples disclose this invention with iodine disproportionated rosins, it is to be understood that such disclosure is only for the purpose of especial illustration of the effectiveness of the invention even with low softening-point rosins. Therefore, it is intended that other rosin materials, such as natural wood rosin, gum rosin, tall oil (or sulfate) rosin, etc., and the modified rosin products thereof, are within the scope of the invention. While modified rosins such as iodine disproportionated rosins are particularly suitable for this invention, in view of their stability toward atmospheric oxidation, rosins modified by other catalysts, such as palladium black, palladium on alumina, powdered nickel, selenium, etc., are also included. As used in the following claims, the term "rosin" is intended to include natural rosins, modified rosins, and rosin materials which have been rendered stable to oxidation. Furthermore, while the particular embodiments of this invention have been shown and described, it will be obvious to those skilled in the art that various changes and modifications may be made without departing from the invention in its broader aspects. As used herein and in the claims, reference to percentage amounts is intended to mean percent by weight based on the combined weight of the clay and rosin.

What is claimed is:

1. As a new product: an intimate mixture of particleized rosin and about 10 to 20 percent of attapulgite clay.

2. As a new product: an intimate mixture of particleized iodine disproportionated rosin and about 10 to 20 percent of attapulgite clay.

3. As a new product: an intimate mixture of particleized rosin and about 5 to 25 percent of attapulgite clay.

4. As a new product: an intimate mixture of particlized iodine disproportionated rosin and about 5 to 25 percent of attapulgite clay.

5. As a new product: an intimate mixture of particleized rosin and from about 1 to 25 percent of attapulgite clay.

6. Particleized rosin rendered free-flowing by a coating of attapulgite clay.

7. As a new product: an intimate mixture of rosin pellets of a size from 3 to 8 mesh and from about 1 to 25 percent of attapulgite clay.

8. Particleized iodine disproportionated rosin rendered free-flowing by a coating of attapulgite clay.

References Cited in the file of this patent

FOREIGN PATENTS 33,056    India _____ Jan. 21, 1948